Figure 1:
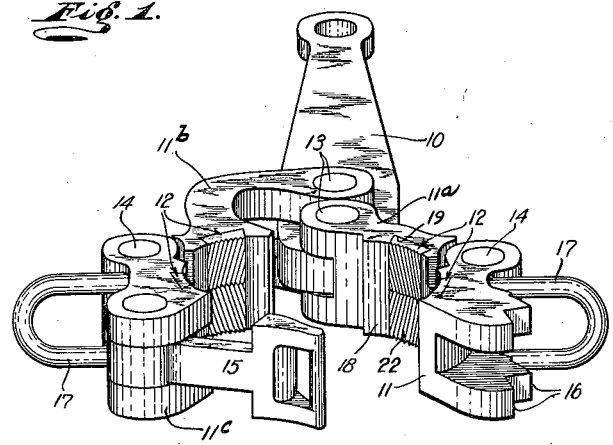

Nov. 9, 1937.   L. F. BAASH   2,098,369

PIPE HANDLING TOOL

Filed June 21, 1935

Inventor
LAWRENCE F. BAASH
By
His Attorney

Patented Nov. 9, 1937

2,098,369

UNITED STATES PATENT OFFICE 2,098,369

PIPE HANDLING TOOL

Lawrence F. Baash, Los Angeles, Calif.

Application June 21, 1935, Serial No. 27,753

1 Claim. (Cl. 81—186)

This invention relates to tools and relates more particularly to tools for gripping and handling pipe and like objects. A general object of this invention is to provide tongs, wrenches, etc. embodying novel and particularly effective gripping means.

It is the common practice to provide the active faces of tongs, wrenches, and like tools with teeth for gripping the objects or pipe engaged by the tools. The gripping teeth of such tools are usually formed directly on the faces of the tools and are usually parallel and disposed to extend longitudinally or axially of the pipe or object being handled. Where the gripping teeth extend longitudinally of the object or pipe they often cut into the object or pipe to seriously damage the same, especially when relative turning movement occurs between the tool and the object or pipe.

Another object of this invention is to provide a tool for handling pipe or the like embodying a gripping means that is operable to firmly and dependably grip an object or pipe with a minimum of damage or injury to the same.

Another object of the invention is to provide a tool for handling pipe and the like embodying gripping serrations or teeth that are disposed to extend both axially and circumferentially of the object or pipe to obtain a particularly effective gripping engagement therewith.

Another object of the invention is to provide a pipe gripping tool having sets or series of pitched or spiralled gripping teeth that extend both axially and circumferentially of the pipe to obtain a particularly effective gripping engagement with the pipe, the adjacent sets or series of teeth being pitched or spiralled in opposite directions whereby the wrench or tool does not tend to twist or spiral on the pipe and the teeth do not cut threads in the pipe.

Another object of the invention is to provide a gripping means or a die for a wrench or tongs that is very dependable and efficient and not as liable to fail or break as the common or usual gripping dies. The teeth of the dies of the present invention in extending diagonally or in being spiralled are not subjected to the severe wear or the heavy breaking forces imposed on the typical straight axial teeth now commonly employed on such tools.

Another object of the invention is to provide gripping dies for wrenches, tongs and the like that are simple and inexpensive of manufacture and that may be easily embodied in or provided on the tools.

Figure 2:
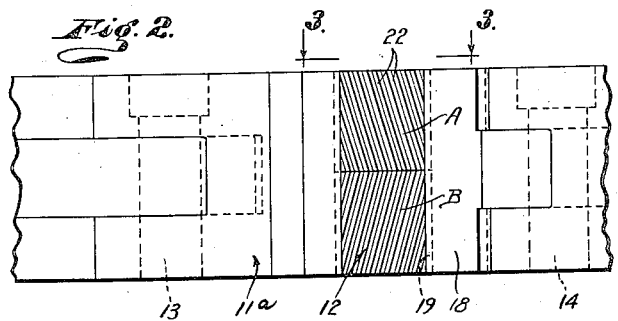
Figure 3:
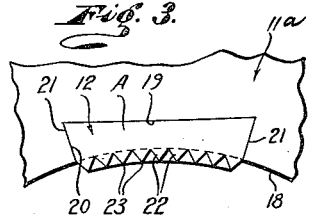
Figure 4:
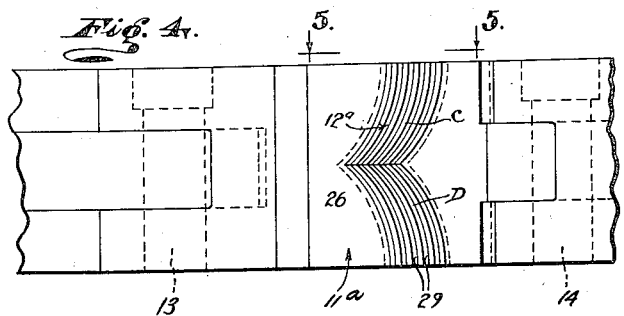
Figure 5:
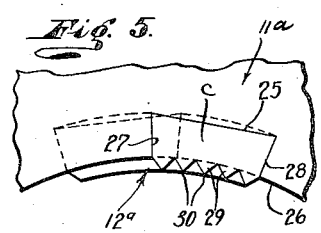
Figure 6:
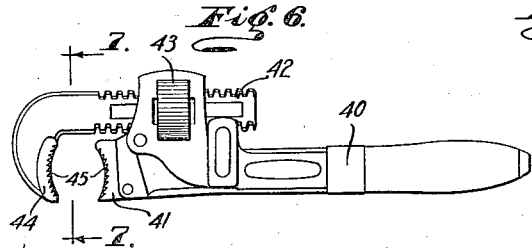
Figure 7:
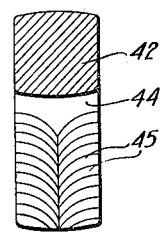

The various objects and features of my invention will be fully understood from the following detailed description of typical preferred forms and applications of the invention, throughout which description reference is made to the accompanying drawing, in which:

Fig. 1 is a perspective view of the active end of the tongs embodying one form of the invention. Fig. 2 is an enlarged fragmentary front elevation of one of the jaws of the tongs illustrated in Fig. 1. Fig. 3 is an enlarged fragmentary plan elevation taken substantially as indicated by line 3—3 on Fig. 2. Fig. 4 is a view similar to Fig. 2 illustrating another form of gripping die provided by the invention. Fig. 5 is an enlarged fragmentary plan elevation taken substantially as indicated by line 5—5 on Fig. 4. Fig. 6 is a plan elevation of a wrench embodying another form of the invention, and Fig. 7 is an enlarged transverse detailed sectional view taken substantially as indicated by line 7—7 on Fig. 6.

The present invention is adapted to be embodied in tools of various characters for handling and gripping pipe and like objects. In the following detailed disclosure I will describe several typical forms and applications of the invention, it being understood that the invention is not to be construed as limited or restricted to the specific forms or applications about to be described, but that it is to be taken as including any features or modifications that may fall within the scope of the claims.

Figs. 1, 2 and 3 of the drawing illustrate one form of the invention embodied in tongs of the class employed in well drilling rigs for handling well casing, drill pipe and like cylindrical objects. The tongs illustrated in the drawing include, generally, a handle 10, gripping jaws 11, 11$^a$, 11$^b$ and 11$^c$, and the gripping elements or dies 12 of the present invention carried by the jaws for engaging the pipe or object to be handled by the tongs.

The handle 10 may be of conventional length and may be provided with suitable means for receiving a line or lines for suspending the tool from an overhead support. The jaws 11, 11$^a$, 11$^b$, and 11$^c$ are carried by the handle 10 and are adapted to extend around or encircle the object or pipe. The jaws 11$^a$ and 11$^b$ which I will term the inner jaws, are connected to the handle 10 by spaced or offset pivot pins 13. The inner jaw 11$^a$ carries the outer jaw 11 and the jaw 11$^b$ carries the outer jaw 11$^c$. The outer jaws 11 and 11$^c$ are pivotally connected to the inner jaws by pivot pins 14. A pivoted latch 15 is carried by the outer jaw 11ᶜ and is adapted to cooperate with shoulders 16 on the outer jaw 11 to hold the assembly of the jaws encircled about the pipe. Suitable handles 17 may be provided on the outer jaws 11 and 11ᶜ. As will be readily understood by those skilled in the art, turning or swinging of the handle 10 in the proper direction while the jaws are latched about the pipe causes the jaws to tighten onto the pipe for the purpose of turning the same or holding the same against turning.

In accordance with the present invention the active elements or jaws 11, 11ᵃ, 11ᵇ and 11ᶜ of the tongs are provided on their inner sides 18 with grooves 19 to receive and hold the gripping elements or dies 12 of the invention. Any one or all of the gripping jaws 11, 11ᵃ, 11ᵇ, and 11ᶜ may have one or more of the grooves 19. In the particular case illustrated in the drawing each jaw 11, 11ᵃ, 11ᵇ, and 11ᶜ is provided on its inner side with a groove 19. The grooves 19 extend longitudinally or axially relative to the object or pipe receiving opening formed by the concave inner surfaces 18 of the pipe encircling jaws. The grooves 19 preferably, though not necessarily, extend between the upper and lower sides of the jaws 11, 11ᵃ, 11ᵇ, and 11ᶜ. The grooves 19 are shaped to dependably hold and retain the dies 12. In accordance with the invention the grooves 19 are dove-tailed having side walls 20 which converge outwardly from or relative to the inner surfaces 18 of the jaws. The outer or bottom walls of the grooves 19 may be flat and vertical.

The gripping elements or dies 12 are arranged in the grooves 19 to project from the inner surfaces 18 of the jaws 11, 11ᵃ, 11ᵇ, and 11ᶜ to engage and grip the pipe or object encircled by the jaws. In the form of the invention being described each die 12 includes two sections A and B, it being understood that the dies 12 may each be single or one piece elements. The die sections A and B are shaped and proportioned to be locked or retained in the grooves 19. The ends 21 of the die sections A and B are outwardly convergent to cooperate with the dove-tailed walls 20 of the grooves. The sections A and B of the dies 12 are proportioned so that they may be driven or force fitted in the grooves 19 to be securely retained therein. The two sections A and B of each die 12 are preferably substantially equal in size and their inner ends are preferably normally in abutment. The outer or exposed ends of the sections A and B may be flat and flush with the upper and lower sides of the tong jaws 11, 11ᵃ, 11ᵇ, and 11ᶜ.

The exposed inner sides of the sections A and B of the dies 12 are provided with gripping parts or teeth 22. The teeth 22 project inwardly beyond the inner surfaces 18 of the tong jaws 11, 11ᵃ, 11ᵇ, and 11ᶜ, and the sides of the individual teeth 22 converge inwardly to relatively sharp edges 23. The teeth 22 are preferably in the form of continuous unbroken ridges and are preferably equally spaced. The edges 23 of the teeth 22 of each die 12 are equidistant from a common point or axis, that is, they lie in a cylindrically curved plane to properly engage the cylindrical surface or periphery of a pipe or the like.

The disposition of the teeth 22 relative to the pipe or object handled by the tongs and the relative disposition of the teeth 22 of the two sections A and B of each die 12 are important features of the invention. In accordance with the invention the teeth are spiralled or helicoidally curved to be oblique or slanted with respect to the longitudinal axis of the pipe receiving opening formed by the tong jaws 11, 11ᵃ, 11ᵇ and 11ᶜ. The teeth 22 of each section A and B are substantially equally spaced throughout their lengths and extend at a comparatively large angle with respect to the horizontal. In accordance with the invention the teeth 22 of the sections A and B of each die are sloped or inclined in opposite directions, that is, the teeth 22 of the section A of a die 12 are pitched or inclined in one direction and the teeth 22 of the section B of the said die are inclined or pitched in the opposite direction. This relating of the teeth 22 of the abutting or adjacent sections A and B of the dies 12 causes the teeth 22 of the dies to resemble a herring bone pattern. If desired or found practical the teeth 22 of the dies 12 carried by adjacent tong jaws 11, 11ᵃ, 11ᵇ, and 11ᶜ may have the reverse angular relation, the upper section A of the die on one jaw having teeth 22 sloping in one direction and the upper section A of the die 12 in the adjacent jaw having teeth 22 sloping in the other direction.

In operation when the jaws 11, 11ᵃ, 11ᵇ, and 11ᶜ are closed about an object or pipe and locked in the encircling relation by the latch 15 the handle 10 is turned to tighten the jaws onto the pipe. The teeth 22 of the dies 12 in projecting from the inner surfaces 18 of the jaws contact or have gripping engagement with the pipe. The teeth 22 in being curved or spiralled are capable of obtaining a more effective gripping engagement with the pipe with less danger of cutting or biting into the pipe to an excessive extent. Due to the pitch or spiral of the teeth 22 they have little or no tendency to chatter or to track in their engagement with the pipe. The teeth 22 in being spiralled or pitched with respect to the pipe extend both longitudinally and axially thereof to more effectively distribute the gripping forces. Further, the pitched or inclined teeth are not as liable to fail or break as straight axial teeth because the thrusts to which they are subjected are principally horizontal and not directly transverse of the teeth. The teeth 22 of the sections A and B of each die 12 in being pitched or spiralled in opposite directions prevent the tool or tong from spiralling or shifting longitudinally on the pipe. Further, the opposite pitching of the adjacent sections A and B of the dies aids in preventing the tracking and chattering of the gripping teeth.

Figs. 4 and 5 of the drawing illustrate another form of the invention which may be considered as embodied in the jaws of the tongs shown in Figs. 1, 2 and 3 of the drawing, or in the jaws of similar tongs. In this form of the invention grooves 25 are provided in the inner or active sides 26 of the jaws to carry dies 12ᵃ. Each groove 25 has an upper portion which is spiralled or helicoidally curved in one direction and a lower portion which is spiralled or helicoidally curved in the other direction. The two oppositely curved upper and lower portions of each groove 25 may be of the same length and width. The inner walls of the grooves 25 may be substantially flat and are preferably suitably spirally curved about the axis of the pipe receiving opening of the tool. In accordance with the invention the grooves 25 are dove-tailed having outwardly convergent side walls 27. The grooves 25 preferably extend between the upper and lower sides of the tong jaws 11, 11ª, 11ᵇ and 11ᶜ.

The dies 12ª of the form of the invention shown in Figs. 4 and 5 of the drawing each include two sections C and D. The sections C and D are fragments or sections of a spiral. The sections C are the upper sections of the dies and are longitudinally curved or spiralled to properly fit the spiralled upper portions of the grooves 25 and the die sections D are likewise spiralled to properly fit the spiralled lower portions of the grooves. The sides 28 of the die sections C and D are outwardly convergent to engage and cooperate with the side walls 27 of the grooves 25. The die sections C and D are proportioned so that they may be driven or force fitted in the grooves 25 to be securely retained therein. The upper and lower ends of the spiralled die sections C and D are preferably straight and horizontal. The inner ends of the sections C and D of each die 12ª may be in abutment as illustrated in Fig. 4. The exposed or outer ends of the sections C and D may be substantially flush with the upper and lower ends of the jaws 11, 11ª, 11ᵇ and 11ᶜ.

Gripping parts or teeth 29 are provided on the die sections C and D to project from the inner sides 26 of the jaws 11, 11ª, 11ᵇ and 11ᶜ to grip the pipe or object. The teeth 29 have converging sides joining at comparatively sharp edges 30. The edges 30 of the teeth 29 of each die 12ª are equidistant from a common point or axis to properly contact the cylindrical periphery of the object or pipe to be handled by the tongs. The teeth 29 are preferably continuous or unbroken ridges which extend between the upper and lower ends of their respective die sections C and D. In accordance with the invention the teeth 29 of each die section C and D are helically curved or spiralled. The teeth 29 follow or are concentric with the longitudinal margins or sides of the die sections C and D as clearly illustrated in Fig. 4 of the drawing. Thus the teeth 29 of the sections C and D of each die 12ª are pitched or spiralled in opposite directions.

In operation the gripping teeth 29 are adapted to obtain a firm and dependable gripping engagement with the pipe. The teeth 29 of the sections C and D comprising each die 12ª in being pitched in opposite directions prevent spiralling of the tongs on the pipe and more effectively distribute the gripping engagement. It is to be particularly noted that the spiralled die sections C and D extend circumferentially as well as axially of the pipe so that the teeth 29 engage the pipe throughout a greater portion of its circumference. The spiralled gripping teeth 29 are adapted to obtain effective gripping engagement with the pipe with a minimum of injury to the pipe.

Figs. 6 and 7 of the drawing illustrate the invention embodied in a wrench for handling relatively small objects or pipe of relatively small diameter. The particular wrench illustrated includes a handle 40 provided at its outer or active end with an outwardly facing jaw 41. A screw rack 42 is shiftable or adjustable longitudinally at the outer portion of the handle 40 by manipulation of a hand nut 43. The rack 42 carries a jaw 44 which faces inwardly or opposes the jaw 41. The active faces of the jaws 41 and 44 are suitably concaved to conform generally to the pipe to be handled. In accordance with the invention the jaws 41 and 44 have dies or gripping parts 45 for engaging the pipe. In the particular case illustrated in the drawing the gripping parts or teeth 45 are formed directly on or are integral parts of the jaws 41 and 44, it being understood that the teeth 45 may be on renewable inserts or dies, if desired. Each jaw 41 and 44 has a series of oblique curved teeth 45 extending in one direction and a series of oblique curved teeth 45 extending in the opposite direction. The teeth 45 are preferably faced or pitched inwardly or away from the mouth of the wrench on the jaw 44 and are pitched in the opposite direction on the other jaw 41 to better grip the pipe. The two obliquely disposed series of curved teeth 45 provided on the active face of each jaw 41 and 44 join at the center lines or medial lines of the jaws. The teeth 45 on the two jaws 41 and 44 may be identical or the angular relationship between the two series of curved teeth on the jaws may be reversed.

The two sets or series of pitched and curved teeth 45 on the wrench jaws 41 and 44 facilitate the secure and dependable engagement of pipe and like objects. The teeth 45 of each body in being pitched in opposite directions operate to prevent slipping of the wrench on the pipe. Because the teeth 45 extend both axially and circumferentially of the object or pipe engaged they have less tendency to bite into or damage the pipe and more effectively distribute the gripping forces. Accordingly, the wrench or tool provided with the teeth 45 is particularly adapted for handling finished pipe, plated pipe, etc. which it may handle without materially injuring the same.

Having described only typical preferred forms and applications of my invention, I do not wish to be limited or restricted to the specific details herein set forth, but wish to reserve to myself any variations or modifications that may appear to those skilled in the art or fall within the scope of the following claim:

Having described my invention, I claim:

In a tool for gripping pipe and like objects, a jaw part having a groove in its active face, the groove including a portion spirally curved in one direction and a portion spirally curved in the other direction, and a die comprising spirally curved sections fitted in the said portions of the groove to be in end to end relation, and gripping teeth on the sections spirally curved to substantially follow the margins of their respective sections and extend both axially and circumferentially of the object or pipe being gripped.

LAWRENCE F. BAASH.